United States Patent
Kahn et al.

(10) Patent No.: US 8,320,272 B2
(45) Date of Patent: Nov. 27, 2012

(54) METHOD AND APPARATUS FOR CONTROLLING ACCESS TECHNOLOGY SELECTION

(75) Inventors: Colin Kahn, Morris Plains, NJ (US); Alistair Urie, Issy-les-Moulineaux (FR); Venkatesh Rao, Naperville, IL (US); Harish Viswanathan, Morristown, NJ (US)

(73) Assignee: Alcatel Lucent, Paris (FR)

( * ) Notice: Subject to any disclaimer, the term of this patent is extended or adjusted under 35 U.S.C. 154(b) by 315 days.

(21) Appl. No.: 12/705,212

(22) Filed: Feb. 12, 2010

(65) Prior Publication Data
US 2011/0199962 A1 Aug. 18, 2011

(51) Int. Cl.
*H04L 12/56* (2006.01)
*H04J 1/16* (2006.01)

(52) U.S. Cl. .................... 370/252; 370/278; 370/329

(58) Field of Classification Search .................. 370/252, 370/329, 278
See application file for complete search history.

(56) References Cited

U.S. PATENT DOCUMENTS

| 7,990,913 | B2 | 8/2011 | Massiera et al. | |
|---|---|---|---|---|
| 8,032,130 | B2 | 10/2011 | Reynolds et al. | |
| 2004/0174853 | A1* | 9/2004 | Saito et al. | 370/338 |
| 2006/0014539 | A1 | 1/2006 | Oh | |
| 2007/0150480 | A1* | 6/2007 | Hwang et al. | 707/10 |
| 2008/0192638 | A1 | 8/2008 | Massiera et al. | |
| 2009/0060028 | A1 | 3/2009 | Liu et al. | |
| 2010/0003975 | A1* | 1/2010 | Barankanira et al. | 455/426.1 |

FOREIGN PATENT DOCUMENTS

| EP | 1435748 | 7/2004 |
|---|---|---|
| EP | 1 708 526 A1 | 10/2006 |
| FR | 2 882 487 A1 | 8/2006 |

OTHER PUBLICATIONS

International Search Report and The Written Opinion of the International Searching Authority, or The Declaration, in PCT/US2001/024119, mailed Jun. 21, 2011, Alcatel-Lucent USA Inc., Applicant, 14 pages.

Venkitaraman N et al: "Session aware network controlled interface selection for multi-homed hosts," Wireless Communications and Networking Conference, 2004. WCNC. 2004 IE EE Atlanta, GA, USA Mar. 21-25, 2004, Piscataway, NJ, USA, IEEE, vol. 4, Mar. 21, 2004, pp. 1963-1968, XP010708294, DOI: DOI: 10.1109/WCNC.2004.1311386 ISBN: 978-0-7803-8344-9.

International Search Report and the Written Opinion of the International Searching Authority, or the Declaration, in PCT/IB2011/000479, mailed Jun. 24, 2011, Alcatel Lucent, Applicant, 7 pages.

\* cited by examiner

*Primary Examiner* — John Pezzlo
(74) *Attorney, Agent, or Firm* — Wall & Tong, LLP

(57) ABSTRACT

A method and system for selecting at a terminal at least one of a plurality of available access networks for use with a wireless application invoked at the terminal according to preferences associated with the wireless application, the network service provider, the subscriber, the subscriber subscription and application content provider. The selection may be constrained by an Application Policy received from a network service provider.

26 Claims, 3 Drawing Sheets

METHOD AND APPARATUS FOR CONTROLLING ACCESS TECHNOLOGY SELECTION

CROSS REFERENCE TO RELATED APPLICATIONS

This application is related to simultaneously filed U.S. patent application Ser. No. 12/705,203, entitled "Method And Apparatus Providing Access Network Aware Presence To Applications," which is herein incorporated by reference in its entirety.

FIELD OF THE INVENTION

The invention relates generally to the field of communication network management and, more specifically but not exclusively, to management of wireless communication networks.

BACKGROUND

Access devices such as smart phones, net books, laptops with wireless access and the like may be capable of using different types of access technologies, such as WiFi (IEEE 802.11), UMTS (3GPP), WiMax (IEEE 802.16), GPRS (3GPP), EV-DO (3GPP2) or LTE (3GPP)

The specific access network and technology used by the access device is selected according to a fixed preference list stored in the device, or according to a preference list transmitted by the access provider. The preferences are typically meant to ensure that service is provided via the subscriber's access provider or a partner provider. The access technology is selected primarily according to signal strength (coverage) considerations and, after being selected, is used to support all services requested by the user.

Access devices may select a different access technology in response to an event trigger based upon changing connectivity conditions at the access device (e.g., such as when the access device moves from an area in which a selected first access technology has good coverage to an area in which a second access technology has good coverage). These types of triggers are defined by 3GPP, 3GPP2, 802.21 and other standards.

Within a specific access technology, quality of service (QoS) differentiation based upon the needs of a requesting application may be provided. For example, a voice over IP (VoIP) application may be accorded preference in an access network according to a business needs and application requirements.

Unfortunately, at times the initial access technology selected by the access device is not best choice for a subsequently invoked application.

For example, when a subscriber invokes a VoIP application on a dual mode 3GPP/WiFi capable device, the voice calls may be served on a WiFi network even if the access provider prefers to have all voice calls served via a 3GPP based technology (e.g., UMTS/LTE) because of the superior capability of the 3GPP based technology to handle mobility for conversation class services. Similarly when a device is accessing a specific technology (e.g., EV-DO, LTE, WiFi, etc.), for packet based services, there is little to no control provided over the conditions under which an application may use that technology. This makes it impossible to establish flexible policies that control selection of an access technology according to criteria important to the application provider, content provider and access provider.

BRIEF SUMMARY

Various deficiencies of the prior art are addressed by the present invention of a method, system and apparatus for controlling access technology selection by a wireless access device capable of communicating via multiple access technologies.

A method according to one embodiment comprises selecting at least one of a plurality of available access networks, both wireless and wired, for use with an application invoked at a terminal according to a preference associated with the application, where the preference takes into account at least one a network service provider preference, a subscriber preference, a subscriber subscription preference and an application content provider preference. The wired access includes all access methods that maintain a physical connection between the access device and the network. The selecting may be constrained by an Application Policy received from a network service provider. The selecting may be performed in response to a user invoking an application at a terminal, an application server initiating a transaction or a peer triggering a transaction. Additional actions may be performed in response to a trigger condition, such as an indication of network congestion or changes in subscriber, application content provider or service provider preferences.

A system according to one embodiment comprises network provider equipment (PE) including a control function server adapted to formulate an Application Policy and forward the Application Policy towards terminals capable of communicating with a plurality of access networks; wherein the Application Policy defines allowable access technology selections, and the conditions under which each may be selected, associated with applications invoked within multiple access network terminal devices.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be primarily described within the context of a wireless access device capable of communicating via a plurality of access technologies, where the wireless access device selects specific access technologies for communication based upon the specific application invoked as well as other factors. However, those skilled in the art and informed by the teachings herein will realize that the invention is also applicable to any communication device in which multiple means of communications are available and different applications having different communication requirements may be invoked.

Figure 1:
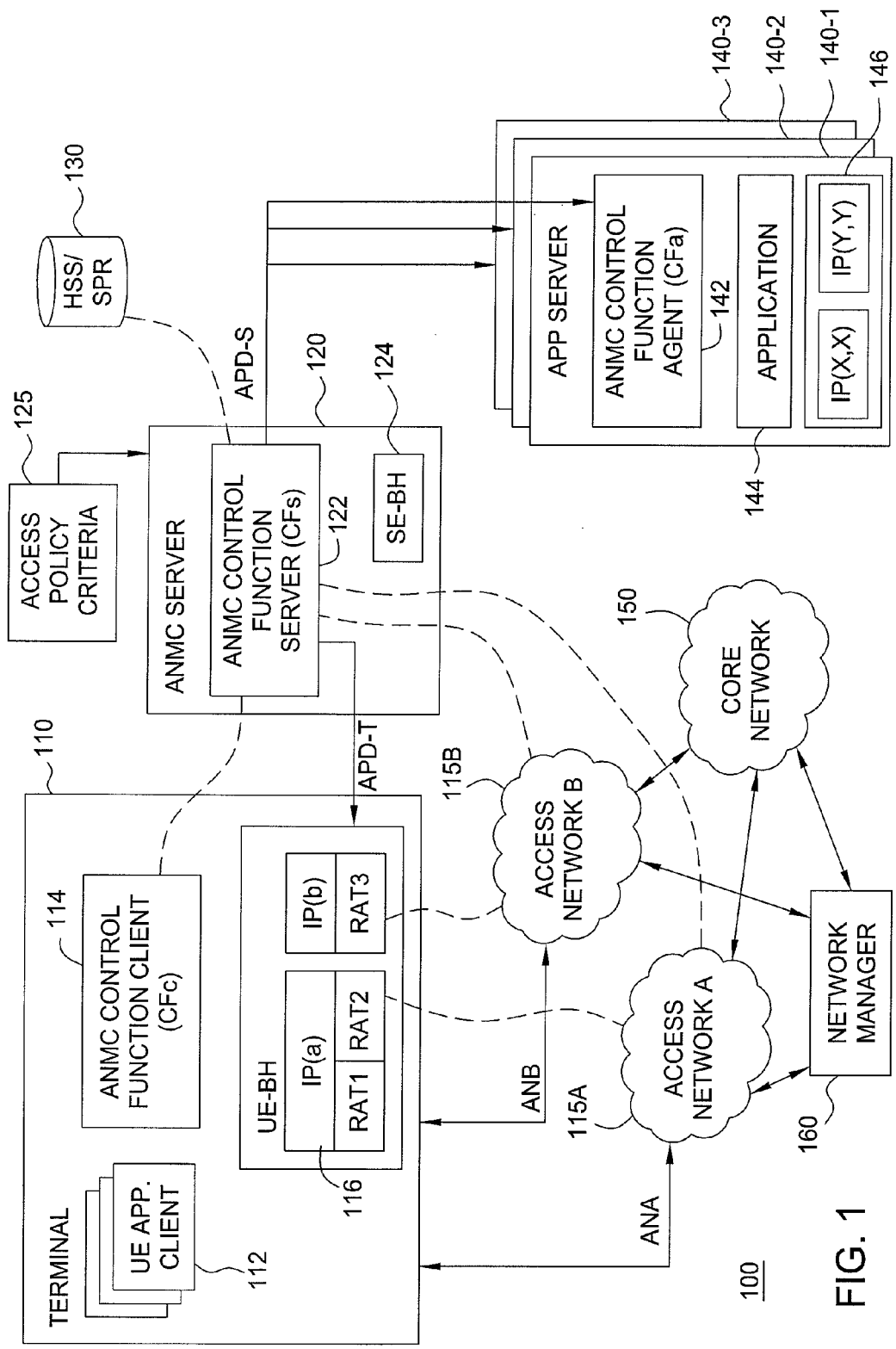
FIG. 1 depicts a high-level block diagram of a system according to one embodiment.

FIG. 1 depicts a high-level block diagram of a system according to one embodiment. Specifically, the system 100 FIG. 1 depicts a single terminal 110 in communication with each of a plurality of access networks 115A, 115B (collectively access networks 115), an access network multi-connectivity (ANMC) server 120, a Home Subscriber System (HSS) and Subscription Profile Repository (SPR) 130, a plurality (illustratively three) of application servers 140, a core network 150 and one or more network managers 160 to manage the various network elements and links forming the various networks discussed herein.

It will be appreciated that while a single terminal 110 is depicted in the system 100 FIG. 1, a typical implementation of such a system would include many terminals 110, where each terminal 110 represents the user equipment (UE) associated with a user or subscriber of a wireless network access provider. The terminals 110 and other user equipment interact with provider equipment (PE) associated with the wireless network access provider, such as eNodeBs, routers, gateways, subnets, servers, managers and the like. The specific access provider equipment used depends upon many factors, including the number and types of access technologies used, the size of the access provider network, the number of subscribers serviced by the access provider, the number of applications supported by the access provider, the geographic scope of the access provider network and so on.

Moreover, it will be appreciated that discussion herein relating to control signaling, bearer traffic and the like is simplified for purposes of clarity. Generally speaking, control signals as well as bearer traffic are communicated between the terminal 110 and ANMC server 120 via one or both of the access networks 115. Generally speaking, the ANMC server 120 communicates with the application servers 140 via a server-side network (not shown) associated with the wireless service access provider, or via the core network 150. In FIG. 1, control signals are generally denoted as dashed lines, while bearer signals are generally denoted as solid lines.

The terminal 110 comprises a wireless network access device capable of using different types of access technologies, such as a smart phone (e.g., iPhone, Blackberry and the like), a net book, a laptop computer, a network access device within an automobile and so on. Generally speaking, the terminal 110 may be implemented using any type of wireless device capable of communicating via multiple types of access technologies, such as provided by access networks 115.

The access networks 115 may comprise any type of access network technology, such as WiFi, UMTS, WiMax, EV-DO, LTE and so on. Each of the access networks 115 facilitate communication between at least the terminal 110 and a core network 150 and/or other network elements and communications with the access networks 115.

The terminal 110 includes a plurality of user equipment (UE) application clients 112, an access network multi-conductivity (ANMC) control function client (CFC) 114, and user equipment bearer handling components (UE-BH) 116. It will be appreciated that the functions indicated herein as separate clients in the Terminal may also be implemented as functional components within a single client.

The UE application clients 112 comprise software executed at the terminal 110 to invoke a specific application, such as a GPS location application, a VoIP application, a video over IP application, a remote television programming application and so on. Each application typically requires interaction between the terminal 110 and various servers, gateways, routers, network elements, other terminals and so on to implement its respective function. The ANMC Control Function Client 114 and the bearer handling components (UE-BH) 116 may be implemented as distinct clients in the UE, as a functional entities within the UE Application Client 112, or incorporated in the IP and lower layers within the Operating System kernel.

The ANMC control functions client (CFC) 114 receives control signaling from an ANMC control functions server (CFS) 122 within the ANMC server 120. The received control signaling includes an Application Policy that is used to determine one or more of the following: (1) the specific access networks 115 (or group of access networks 115) used to support a particular application client 112 and/or application server 140, or type of UE application client 112; (2) the QOS level, permissions or other criteria associated with one of more of the UE application clients 112; (3) interactions adapted to change the service level associated with a particular subscriber to meet Service Level Agreement (SLA) criteria; and (4) other aspects of the operation of applications within the terminal 110. Generally speaking, the ANMC control functions client (CFC) 114 adapts the operation of the terminal 110 and/or applications invoked within terminal 110 in conformance with service provider policies specific to the application as determined in the CFS 122 within the ANMC server 120.

The UE-BH function 116 comprises the hardware/software within the terminal 110 operable to receive and transmit information via the access networks 115. The UE-BH function 116 conveys control signaling and bearer traffic between the functional elements within the terminal 110 and the external functional elements, such as the ANMC server 120 and application servers 140. It is responsible for bearer handling functions to execute the Application Policy, including the mapping of application packets to and from the correct access network 115 as determined by Application Policy.

The access network multi-connectivity (ANMC) server 120 includes an ANMC control functions server (CFS) operable to control the operation of the terminal 110 and/or applications invoked within terminal 110 in response to an Application Policy associated with the terminal 110 that reflects, the subscriber preferences associated with the terminal 110, the needs, applications invoked within the terminal 110 or other criteria.

Each of the application servers 140-1, 140-2 and 140-3 (collectively application servers 140) comprises the hardware/software associated with a corresponding application capable of being invoked by an application client 112 in the terminal 110. Application servers 140 may be located with provider equipment (PE) such as the ANMC server 120, located at a network operation center of an application provider or content provider, at each of the plurality of mirror sites serving a user community or specific provider network and so on. Generally speaking, the application servers 140 comprise the equipment, software and firmware necessary to interact with the user via a network to provide thereby application services, content delivery, VoIP services and so on.

Each application server 140 is depicted as including an ANMC control function agent (CFA) 142, an application instance 144 and an application equipment bearer handling function (AE-BH) 146. The ANMC Control Function Agent 142 and Application equipment bearer handling function 146 may be implemented as distinct application components within the Application Server 140, as functional entities within the application 144 providing service to the UE 110 or incorporated in the IP and lower layers within the Operating System kernel on the Application server.

The application 144 interacts with the application client 112 of the terminal 110 to deliver the services associated with the specific application (e.g., location services, VoIP, video and the like). The application equipment bearer handling function (AE-BH) 146 maps packets associated with the traffic flows of the application to the appropriate bearer channels, such as to one or more of access networks 115. The ANMC control function agent (CFA) 142 controls the operation of the application 144 and AE-BH function 146 in conformance with an Application Policy received from the ANMC server 120.

The ANMC server 120 distributes an Application Policy to the terminal 110 via a corresponding Application Policy distribution path (APD-T), illustratively via a control channel or bearer channel within any of the access networks 115 compatible with the terminal 110. In the case of multiple terminals 110, each of the multiple terminals 110 receives from the ANMC server 120 a corresponding Application Policy. Different terminals 110 may have the same Application Policy or different Application Policies, depending upon the service level agreement associated with the terminal, the applications invoked by the terminal and/or other factors discussed herein. The application policy may be formulated using criteria from an application policy source 125, such as a service level agreement (SLA), network operator criteria/guidelines and so on.

Information used to define the Application Policy for access technology selection is received from a variety of sources, including one or more of the access provider associated with one or more of the access networks 115, subscriber information preferences, application information board preferences, network operating parameters (e.g., network congestion indicators, QoS indicators etc.) and so on. The information used to define the Application Policy is hierarchical in nature in various embodiments. For example, access provider policies may constrain subscriber and application provider requested policies in view of service-level agreements, network congestion indicators, QOS indicators and the like.

Access provider policies define the behavior of terminals and applications within the access provider's network in accordance with the goals of the access provider in managing its network(s). The Access provider policies are reflected in the Application Policy used to determine bearer availability for an application. A separate Application Policy may be provided for each application or service that the access provider wishes to control. Additionally, separate Application Policy may be provided for each user according to user subscription information known to the access provider. The policy may be periodically updated according to changing network conditions or other criteria important to the access provider. A default Application Policy may be invoked for applications for which an explicit policy has not been established.

Aspects of the Application Policy sent to the terminal may be modified by the subscriber, as allowed by the access provider. This allows the end-user to personalize aspects of their service in a manner permitted by the Access Provider.

Aspects of the Application Policy sent to the terminal may be modified by one or more applications, as allowed by the access provider. This allows the application provider to personalize or optimize aspects of its service to the end-user in a manner permitted by the Access Provider.

While the Application Policy may be modified in response to terminal requests, application requests and/or other information from various sources, the limits of such modifications are ultimately constrained by the access provider through the access provider policies included within the Application Policy. That is, the access provider determines which aspects of the Application Policy may be modified by the terminal/application, when such modifications may be made, under what conditions such modifications may be made, the extent to which such modifications may be made and so on.

One example of an access provider policy is a stipulation that during busy hours of the day (or when network congestion metrics are above a threshold level), certain applications will not be allowed to use 3GPP based access. For example, the video applications may be prohibited during certain critical hours or as a response to network congestion. In this manner, access network enforcement of QoS levels associated with the access providers' subscriber community may be maintained for at least the allowed applications.

Another example of an access provider policy is a stipulation that under predefined circumstances certain application requests will be honored, while other application requests will be over-ridden. For example, an access provider may wish to always support VoIP service on a specific 3GPP technology platform, irrespective of the technology platform requested by the application (i.e., a VoIP application requesting use of an available WiFi technologies will instead be forced to use and available 3GPP access technology). In this manner, QoS levels associated with individual subscribers or subscriber applications may be maintained, irrespective of subscriber or application request.

Another example of an access provider policy is a hierarchical stipulation of the access technology to be used by an application when the Terminal establishes multiple connectivity options. This controls whether an application will switch to a newly available access option or maintain service on a previously available access. Hence a streaming application may switch to WiFi when it becomes available due to mobility induced coverage changes, whereas an active VoIP call may be maintained on 3GPP access.

Subscriber preferences and subscriber subscription preferences may be stored at the ANMC server or other service equipment (SE), such as at HSS/SPR 130. Subscriber preferences may also be stored at the terminal 110.

The Home Subscriber System (HSS) and Subscription Profile Repository (SPR) 130 contain per-subscriber subscription information for specific services/applications. In one embodiment, this information is used to alter the Application Policy according to the services authorized for the subscriber. This allows access providers to charge subscribers for enhanced delivery of a service. For example, an access provider may wish to stipulate that a video service will only be available via WiFi, unless the subscriber pays an additional fee to receive the service via LTE. The per-subscriber authorization to support this may be obtained from the HSS/SPR.

Application preferences may be provided/received via an application programming interface (API) supporting one or more of the application client 112 in the terminal 110 and the Application Server 140. Application preferences may be communicated by other means (e.g., via signaling/control channels or bearer channels). Applications may be offered to subscribers directly from the access provider (so-called "walled garden" applications) or from third party providers (so-called "over-the-top" applications). In either case, the specific application offered to the subscriber may have requirements supportable by relatively low cost or low bit rate networks, requirements necessitating the use of relatively high cost or high bit rate networks, asymmetrical forward/backward bandwidth requirements and the like.

Network operating parameters (e.g., congestion state and/or other indicators) may be received via an API or other means from, illustratively, access network Operations, Administration and Maintenance (OAM) systems (not shown) or network monitoring appliances (not shown). The ANMC Server 120 aggregates congestion information and/or other network operator parameter information from one or more of the available access networks. Based on this information, the Application Policy which determines the network(s) to be selected may be updated to reflect the changes in access network conditions.

Referring to FIG. 1, the ANMC Control Function Server (CFS) 122 gathers the information relevant to the formulation of and Application Policy, formulates an Application Policy for each terminal and/or application, and distributes the formulated application policies to one or more of the appropriate ANMC Control Function Clients (CFC) 114 in the terminals 110, and to the appropriate ANMC control function application (CFA) 142 within the application server 140. As previously noted, these Application Policy distribution paths may be supported by any control channels or bearer channels supported by the access networks 115, core network 150 or other communication mechanism.

An Application Policy may be distributed when an application is invoked, or it may be pre-loaded and stored in a terminal 110. In either case the Application Policy may be subsequently updated at any time.

The CFC 114 in the terminal 110 is responsible for receiving the policy, and directing bearer handling components of the invention to use a selected access technology. It may also trigger scanning for additional access options if the current access options are not consistent with those in the Application Policy.

The bearer handling components of the UE-BH function 116 are responsible for mapping packets to the correct access technology when more than one access technology is available. This mapping they be accomplished using one or more of the following mechanisms: (1) Mobile IPv4/IPv6 extensions that permit flow binding to a Care-of-address associated with the access network; (2) Use of a Traffic Flow Template (TFT) to map traffic to a desired interface; (3) Use of operating specific APIs that permit Source Routing to an interface associated with the Source IP address; (4) Use of APIs that allow routing table default route modifications to associate packets with the desired interface; and/or (5) other mechanisms.

When UE application clients 112 and their associated applications are capable of supporting only one access network option (e.g., a single IP address), the UE-BH function 116 maps packets received from the UE Application Client 112 to only one of either Access Network A (115A) or Access Network B (115B). In this embodiment, the UE-BH function 116 wraps each packet (or group of packets) received from the Application Client 112 for transmission via a tunnel that terminates at the ANMC server 120. The ANMC server 120 then unwraps/extracts the packet or group of packets from the tunnel, and forwards the packet or group of packets to the corresponding Application.

In various embodiments, a bearer handling control function may be included within one or more of the application invoked at the terminal, network adapters, network device drivers and the terminal operating system.

When UE application clients 112 and their associated applications 144 are capable of supporting multiple access network options (e.g., multiple simultaneous IP addresses), the UE-BH function 116 may be incorporated within the Application Client 112. In this embodiment, the application client 112 receives a directive from the control function client (CFC) 114 indicating the access network to use for an application. The access network may be identified using one or more of the following mechanisms: (1) The IP address of the access network interface; (2) The Network Identifier (e.g., SSID/PLMN ID) of the access network; (3) A MIP agent advertisement identifying an available network; (4) A Network Name; and/or (5) Other mechanisms that identify the access network. In response, the UE-BH function 116 maps packets to Access Network A 115A and/or Access Network B 115B accordingly. In this case no bearer tunnel through the ANMC Server is required.

The Control Function Application (CFA) within the application server 140 performs a function similar to that of the control function client (CFC) within the terminals 110; namely, informing the corresponding bearer handling component (AE-BH function 146) in the Application Server 120 to map packets to the appropriate access network 115. In another embodiment, the CFA function may be incorporated into the Application. In this case no tunnel is required and packets are sent directly between the Application and Terminal Client via the chosen access network.

Figure 2:
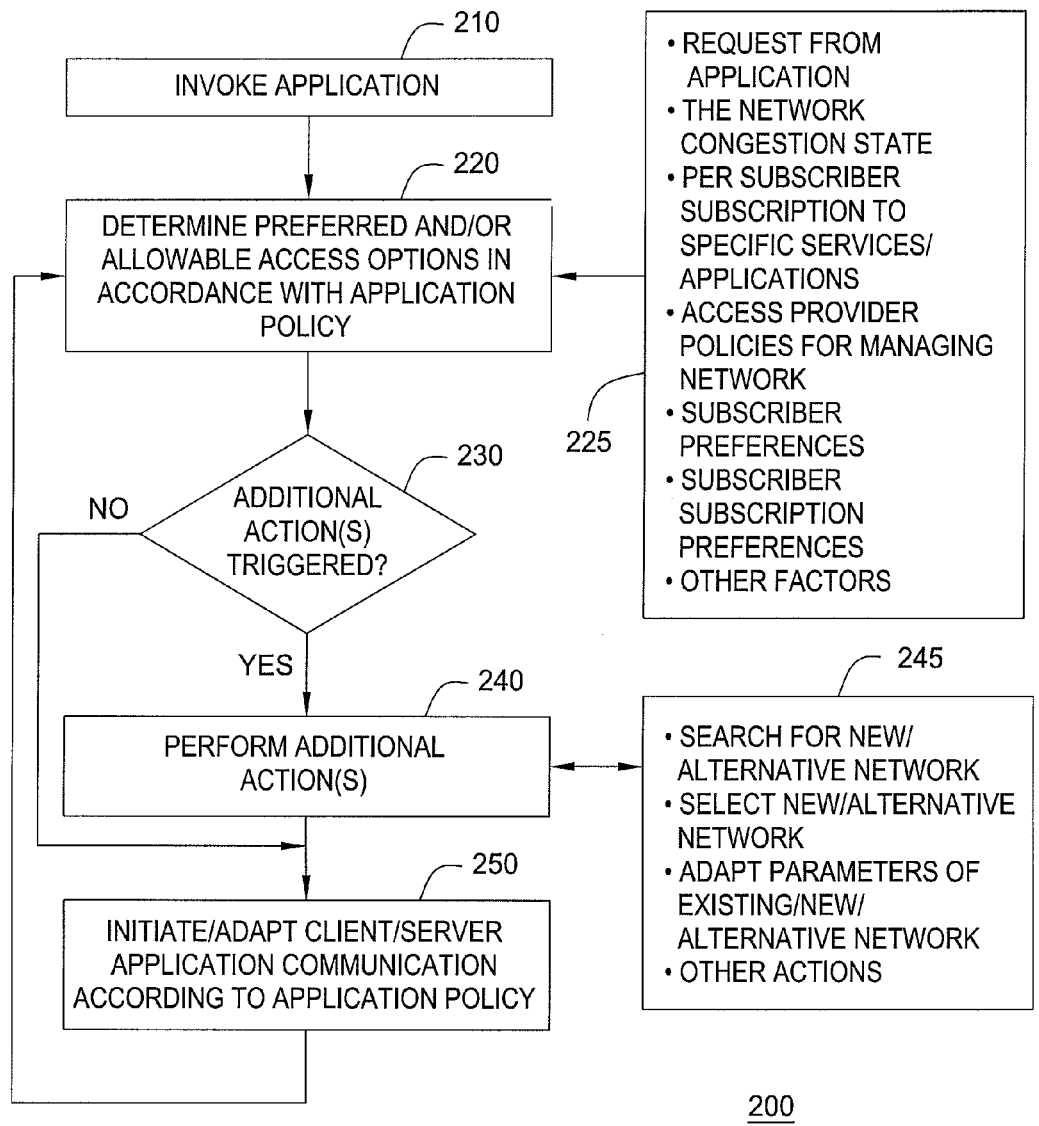
FIG. 2 depicts a flow diagram of a method according to one embodiment.

FIG. 2 depicts a flow diagram of a method according to one embodiment. Specifically, FIG. 2 depicts a flow diagram of a method suitable for use in a terminal 110.

At step 210, an application is invoked by the wireless access device or terminal 110. The application may comprise, illustratively, a VoIP application, a browser application, a GPS/mapping application, a video over IP application and so on.

At step 220, a determination is made as to the preferred and/or allowable access technology options associated with the application in accordance with an Application Policy previously received by the access device via the access network. As previously noted, the Application Policy is controlled by the access provider and, referring to box 225, takes into consideration one or more of the following criteria:

Requests from Applications for a specified access technology;
Network Congestion state;
Per-subscriber subscription to specific services/applications;
Access Provider policies for how they wish to manage their network;
Subscriber Subscription Preference
Subscriber preferences; and
Other factors.

At step 230, a determination is made as to whether the examination of the Application Policy triggers a need to perform one or more additional actions.

At step 240, any triggered additional actions are performed. Referring to box 245, such additional actions may comprise searching for an additional access network, searching for an alternative access network, selecting for use by the application an additional access network, selecting for use by the application an alternative access network, adapting the use of parameters associated with one or more access networks and/or other actions.

Generally speaking, the Application Policy may trigger the terminal to make access network selection changes, access network usage changes and the like. A search for additional and/or alternative access technology may be triggered when, illustratively, the access options currently in use by the device are either insufficient to meet the QOS needs of the invoked application or, conversely, excessive with respect to the QOS needs of the invoked application.

Depending upon the stipulations in the Application Policy, no access option may be selected, a single access option may be selected, or multiple access options may be selected. In one embodiment, if multiple access options are selected then the application may use multiple simultaneous bearers established in the access networks to support the application (e.g., allowing a VoIP service via UMTS with simultaneous video via WiFi).

At step 250, the wireless access device or terminal 110 initiates new communications or adapts existing communications with the application server 140 supporting the invoked application in accordance with the Application Policy. In this manner, the Application Policy may define one or more access networks to be used in support of the application, the specific loading imparted to a network by the application, any time periods during which the application loading of an access network may be constrained and so on. The selection of the one or more access networks 115 is made according to the Application Policy criteria and, in the embodiment of FIG. 1, supported by the user equipment bearer handling components (UE-BH) 116.

The method 200 then proceeds to step 220, where a determination with respect to the preferred and or allowable access options may be made in accordance with any changes that occurred with respect to the Application Policy, such as with respect to time of day, network congestion and/or other criteria.

Figure 3:
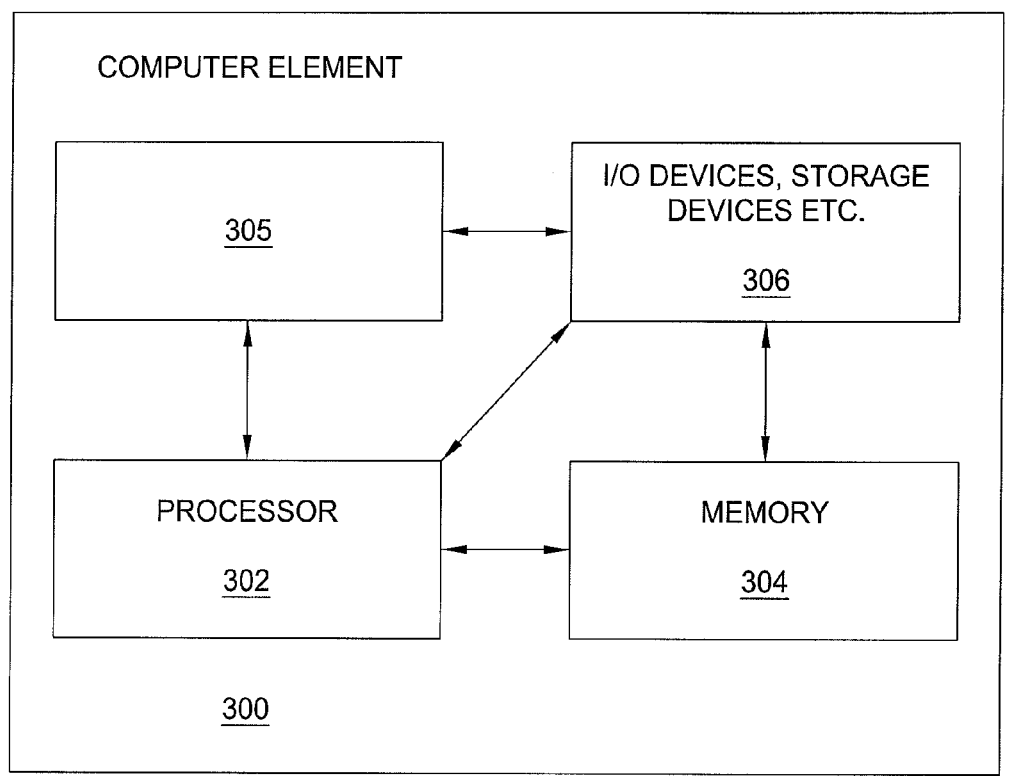
FIG. 3 depicts a high-level block diagram of a computer suitable for use in performing the functions described herein.

FIG. 3 depicts a high-level block diagram of a computer (computing element) suitable for use in performing the functions described herein. Specifically, the computer 300 depicted in FIG. 3 provides a general architecture and functionality suitable for implementing at least portions of user equipment (such as terminal 110), provider equipment (such as ANMC server 120 and HSS/SPR 130) and application equipment (such as application servers 140).

As depicted in FIG. 3, computing element 300 includes various cooperating elements, including a processor element 302 (e.g., a central processing unit (CPU) and/or other suitable processor(s)), a memory 304 (e.g., random access memory (RAM), read only memory (ROM), and the like) and various input/output devices 306 (e.g., a user input device (such as a keyboard, a keypad, a mouse, and the like), a user output device (such as a display, a speaker, and the like), an input port, an output port, a receiver/transmitter (e.g., an air card or other suitable type of receiver/transmitter), and storage devices (e.g., a hard disk drive, a compact disk drive, an optical disk drive, and the like)). FIG. 3 also depicts a further cooperating element 305 that may be used to augment the functionality of the processor(s) 302, memory 304 and I/O devices 306 or to implement any of the various or additional functions as described herein. In various alternate embodiments, cooperating element 305 may comprise a control function client, control function server, control function agent, bearer function, management function and the like.

It should be noted that functions depicted and described herein may be implemented in software and/or in a combination of software and hardware, e.g., using a general purpose computer, one or more application specific integrated circuits (ASIC), and/or any other hardware equivalents. In one embodiment, software implementing methodology or mechanisms supporting the various embodiments is loaded into memory 304 and executed by processor(s) 302 to implement the functions as discussed herein. Thus, various methodologies and functions (including associated data structures) can be stored on a computer readable storage medium, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible fixed or removable media, transmitted via a data stream in a tangible or intangible broadcast or other signal bearing medium, and/or stored within a memory within a computing device operating according to the instructions.

The above-described invention provides a mechanism to control access methods used by terminals on a per-application basis, while enhancing the ability of service providers to control how applications are supported on their networks. The various embodiments enable wireless service providers to offer new services in 3G/4G/WiFi networks by minimizing the impact of applications on the more band-limited access options. Thus, wireless service providers utilizing various embodiments may offer application/content providers access to the API to request access network services. Additionally, wireless service providers will thereby generate additional revenue from end-users by offering them enhanced access options associated with preferred services.

The above-described teachings and embodiments provided herein, such as methods, apparatus, systems and the like for controlling access technology selection, may be adapted in various combinations with the teachings and embodiments such as methods, apparatus, systems and the like for providing network aware presence disclosed in U.S. patent application Ser. No. 12/705,203, which is entitled "Method And Apparatus Providing Access Network Aware Presence To Applications," and which is herein incorporated by reference in its entirety.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method, comprising:
    selecting at least one of a plurality of available access networks for use with an application invoked at a terminal according to preferences associated with the application, the preferences comprising one or more of network service provider preferences, subscriber preferences, subscriber subscription preferences, and application content provider preferences; and
    in response to a trigger condition, performing at least one of a plurality of additional actions at the terminal.

2. The method of claim 1, wherein said selecting is constrained by an Application Policy received from a network service provider.

3. The method of claim 1, wherein said selecting is performed in response to a user invoking an application at the terminal.

4. The method of claim 1, wherein said additional actions comprise searching for an additional access network, searching for an alternative access network, selecting for use with the wireless application one or both of an additional or alternative access network, and adapting one or more operating parameters associated with a additional or alternative access network.

5. The method of claim 1, wherein said trigger condition comprises an indication of network congestion above a threshold level.

6. The method of claim 1, wherein said trigger condition comprises a change in access provider policy, subscriber preference, subscriber subscription preference or application preference.

7. The method of claim 1, wherein subscriber preferences are entered and stored on the terminal.

8. The method of claim 1, wherein subscriber subscription preferences are obtained at a Home Subscriber System (HSS) and Subscription Profile Repository (SPR).

9. The method of claim 1, wherein said step of selecting is performed for each of a plurality of applications invoked at the terminal.

10. The method of claim 1, wherein said plurality of available access networks comprises at least two of WiFi, GPRS, UMTS, WiMax, EV-DO, LTE and wired based access networks.

11. The method of claim 1, wherein multiple access networks are selected to support a single wireless application, the method further comprising:
adapting bearer handling components of the terminal to map packets associated with the single wireless application to each of the multiple selected access networks.

12. The method of claim 11, wherein a bearer handling control function is included within one or more of the application invoked at the terminal, network adapters, network device drivers and the terminal operating system.

13. The method of claim 1, wherein a single access network is selected to support a single wireless application, the method further comprising:
adapting bearer handling components of the terminal to wrap packets for transmission via a tunnel supported by the single access network.

14. An apparatus, comprising:
a processor and a memory communicatively connected to the memory, the processor configured to:
select at least one of a plurality of available access networks for use with an application invoked at a terminal according to preferences associated with the application, the preferences comprising one or more of network service provider preferences, subscriber preferences, subscriber subscription preferences and application content provider preferences; and
in response to a trigger condition, perform at least one of a plurality of additional actions at the terminal.

15. The apparatus of claim 14, wherein the processor is configured to constrain the selection based on an Application Policy received from a network service provider.

16. The apparatus of claim 14, wherein the processor is configured to perform the selection in response to a user invoking an application at the terminal.

17. The apparatus of claim 14, wherein the additional actions comprise searching for an additional access network, searching for an alternative access network, selecting for use with the wireless application one or both of an additional or alternative access network, and adapting one or more operating parameters associated with a additional or alternative access network.

18. The apparatus of claim 14, wherein the trigger condition comprises an indication of network congestion above a threshold level.

19. The apparatus of claim 14, wherein the trigger condition comprises a change in access provider policy, subscriber preference, subscriber subscription preference, or application preference.

20. The apparatus of claim 14, wherein subscriber preferences are entered and stored on the terminal.

21. The apparatus of claim 14, wherein subscriber subscription preferences are obtained at a Home Subscriber System (HSS) and Subscription Profile Repository (SPR).

22. The apparatus of claim 14, wherein the processor is configured to perform selections for each of a plurality of applications invoked at the terminal.

23. The apparatus of claim 14, wherein the plurality of available access networks comprises at least two of WiFi, GPRS, UMTS, WiMax, EV-DO, LTE and wired based access networks.

24. The apparatus of claim 14, wherein multiple access networks are selected to support a single wireless application, wherein the processor is configured to:
adapt bearer handling components of the terminal to map packets associated with the single wireless application to each of the multiple selected access networks.

25. The apparatus of claim 24 wherein a bearer handling control function is included within one or more of the application invoked at the terminal, network adapters, network device drivers and the terminal operating system.

26. The apparatus of claim 14, wherein a single access network is selected to support a single wireless application, wherein the processor is configured to:
adapt bearer handling components of the terminal to wrap packets for transmission via a tunnel supported by the single access network.

* * * * *